United States Patent
Abel et al.

(10) Patent No.: US 7,731,152 B2
(45) Date of Patent: Jun. 8, 2010

(54) REVERSED ACTUATOR WITH MINIMAL LEAK POTENTIAL

(75) Inventors: Micah S. Abel, Chandler, AZ (US); Charles E. Kesner, Mesa, AZ (US); Craig T. Dorste, Phoenix, AZ (US); Javier Gutierrez, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 287 days.

(21) Appl. No.: 11/479,794

(22) Filed: Jun. 30, 2006

(65) Prior Publication Data

US 2008/0001108 A1 Jan. 3, 2008

(51) Int. Cl.
*F16K 31/00* (2006.01)

(52) U.S. Cl. .................. 251/63.5; 251/62; 251/279; 251/305

(58) Field of Classification Search ............ 251/62, 251/63.5, 63.6, 279, 305
See application file for complete search history.

(56) References Cited

U.S. PATENT DOCUMENTS

| | | | |
|---|---|---|---|
| 2,812,774 | A | 11/1957 | Anderson et al. |
| 2,884,003 | A | 4/1959 | Jensen |
| 3,122,065 | A | 2/1964 | Laun |
| 3,175,473 | A | 3/1965 | Boteler et al. |
| 3,512,550 | A | 5/1970 | Ammann |
| 3,519,016 | A | 7/1970 | Kah, Jr. et al. |
| 3,771,759 | A | 11/1973 | Pauquette |
| 4,163,543 | A | 8/1979 | Cook |
| 4,180,239 | A | 12/1979 | Valukis |
| 4,261,546 | A | 4/1981 | Cory et al. |
| 4,309,022 | A | 1/1982 | Reinicke et al. |
| 4,363,463 | A | 12/1982 | Moon, Jr. |
| 4,398,393 | A | 8/1983 | Ipsen |
| 4,489,756 | A | 12/1984 | Balz |
| 4,497,335 | A | 2/1985 | Masuda |
| 4,712,576 | A * | 12/1987 | Ariizumi et al. ............ 137/270 |
| 4,721,284 | A | 1/1988 | Bankard |
| 4,903,939 | A | 2/1990 | Ariizumi et al. |

(Continued)

FOREIGN PATENT DOCUMENTS

WO 9942753 8/1999

OTHER PUBLICATIONS

European Search Report dated Oct. 10, 2008.

*Primary Examiner*—John K Fristoe, Jr
(74) *Attorney, Agent, or Firm*—Ingrassia Fisher & Lorenz, P.C.

(57) ABSTRACT

An apparatus is provided for a valve actuator assembly comprising an actuator housing, a piston, and a spring. The piston is disposed within the actuator housing. The piston is configured to couple to a valve element, and includes an inner cylindrical section and an outer cylindrical section. The outer cylindrical section of the piston is spaced apart from the inner cylindrical section to define a recess. The piston is further configured to move within the actuator housing in a first direction and a second direction, to thereby move the valve element toward a first position and a second position, respectively. The spring is disposed within the actuator housing, and is configured to supply a bias force that urges the piston to move in the first direction. The spring is at least partially disposed within the recess, and at least partially surrounding the inner cylindrical section.

20 Claims, 3 Drawing Sheets

U.S. PATENT DOCUMENTS

| | | |
|---|---|---|
| 5,003,864 A | 4/1991 | Dyer |
| 5,279,325 A | 1/1994 | Kaspers |
| 5,953,915 A | 9/1999 | Weller |
| 6,007,045 A | 12/1999 | Heiniger et al. |
| 6,042,081 A | 3/2000 | Anderson |
| 6,976,359 B2 | 12/2005 | Hastings et al. |
| 7,278,441 B2 * | 10/2007 | Tanikawa et al. ............ 137/270 |

* cited by examiner

REVERSED ACTUATOR WITH MINIMAL LEAK POTENTIAL

TECHNICAL FIELD

The present invention generally relates to a regulator valve, and more particularly relates to a regulator valve with an actuator assembly with a piston and a spring.

BACKGROUND

Valves are used to control gases or other fluids in various types of apparatus and vehicles, such as aircraft. For example, valves can be used to control the supply of fluid in anti-icing aircraft systems by opening, closing, or partially obstructing various passageways, among various other valve uses. There are many different types of valves used in aircraft, other vehicles, and other apparatus, such as regulator valves, ball valves, and check valves, among others.

By way of example only, a particular type of regulator valve regulates the pressure of the fluid flowing through the valve via a downstream sensor, so that the pressure downstream is relatively constant, or at least variable only within a limited range. For example, when the downstream sensor senses a downstream pressure change, the regulator valve opens or closes, at least partially, to adjust fluid flow through the regulator valve, to thereby regulate the downstream fluid pressure. In this example, such regulation of fluid pressure can be facilitated by an actuator assembly. Such an actuator assembly may include an actuator housing having a spring, and further having a piston that defines an opening chamber and a closing chamber for the regulator valve.

Although actuator assemblies generally work well with regulator valves in regulating the pressure of the fluid flowing through a valve, in some instances the regulator valves may be sensitive to leaks in the actuator housing. In addition, when actuator assemblies are designed to minimize such potential leaks, the actuator assemblies can increase in size or weight, and/or result in an increased potential for detrimental effects from vibration. Accordingly, there is a need for an actuator assembly that has less potential for leakage, while not substantially increasing in size or weight, and/or without a substantial increase in potential detrimental effects from vibration.

BRIEF SUMMARY OF THE INVENTION

An apparatus is provided for an assembly for a valve actuator. In one embodiment, and by way of example only, the assembly is a valve actuator assembly comprising an actuator housing, a piston, and a spring. The piston is disposed within the actuator housing. The piston is configured to couple to a valve element, and includes an inner cylindrical section and an outer cylindrical section. The outer cylindrical section of the piston is spaced apart from the inner cylindrical section to define a recess. The piston is further configured to move within the actuator housing in a first direction and a second direction, to thereby move the valve element toward a first position and a second position, respectively. The spring is disposed within the actuator housing, and is configured to supply a bias force that urges the piston to move in the first direction. The spring is at least partially disposed within the recess, and at least partially surrounds the inner cylindrical section.

In another embodiment, and by way of example only, the assembly is a valve assembly comprising a valve body, a valve element, and an actuator assembly. The valve body includes an inlet port, an outlet port, and a flow passage therebetween. The valve element is movably disposed within the valve body flow passage. The actuator assembly is configured to move the valve element, and comprises an actuator housing, a piston, and a spring. The piston is disposed within the actuator housing. The piston is configured to couple to the valve element, and includes an inner cylindrical section and an outer cylindrical section. The outer cylindrical section of the piston is spaced apart from the inner cylindrical section to define a recess. The piston is further configured to move within the actuator housing in a first direction and a second direction, to thereby move the valve element toward a first position and a second position, respectively. The spring is disposed within the actuator housing, and is configured to supply a bias force that urges the piston to move in the first direction. The spring is at least partially disposed within the recess, and at least partially surrounds the inner cylindrical section.

In yet another embodiment, and by way of example only, the assembly is a valve actuator assembly comprising an actuator housing, a piston, and a spring. The piston has a first side and a second side, and is disposed within the actuator housing. The piston is configured to couple to a valve element, and includes an inner cylindrical section and an outer cylindrical section. The outer cylindrical section is spaced apart from the inner cylindrical section to define a recess. The piston is further configured to move within the actuator housing in a first direction and a second direction, to thereby move the valve element toward a first position and a second position, respectively. The piston defines a closing chamber between the piston first side and the actuator housing. The spring is disposed within the actuator housing, and is configured to supply a bias force that urges the piston to move in the first direction. The spring is at least partially disposed within the recess, and at least partially surrounds the inner cylindrical section.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
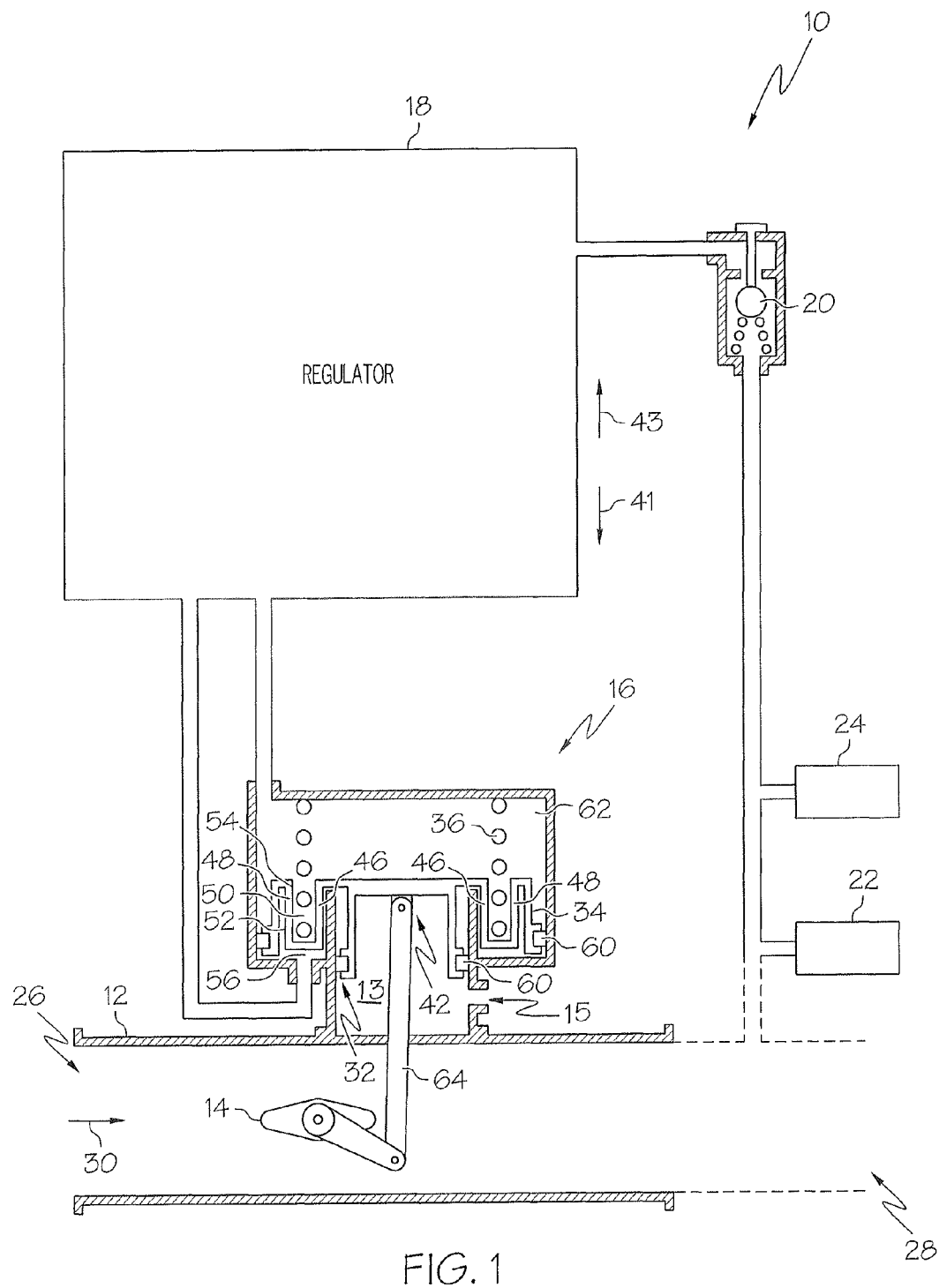
FIG. 1 depicts a schematic view of a valve assembly with a valve body, a valve element, a flow passage, and an actuator assembly.

FIG. 1 depicts a schematic view of an exemplary embodiment of a valve assembly 10. The valve assembly 10 includes a valve body 12, a valve element 14, and an actuator assembly 16. In some embodiments, the valve assembly may also include a regulator 18, a manual lock 20, a low pressure sensing switch 22, and/or a high pressure sensing switch 24.

Figure 2:
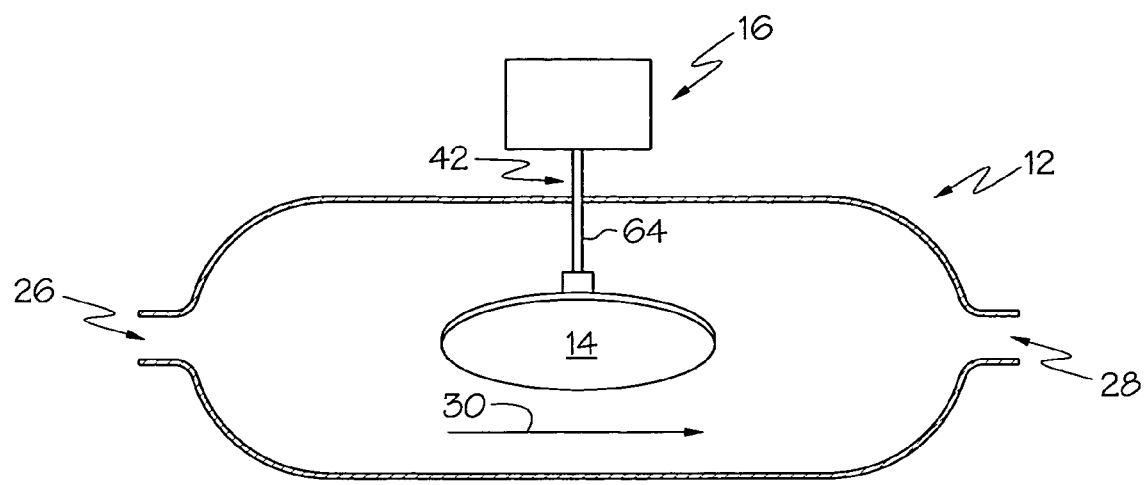
FIG. 2 depicts a schematic view of one embodiment of a valve element used in the valve assembly of FIG. 1, shown in the open position.
Figure 3:
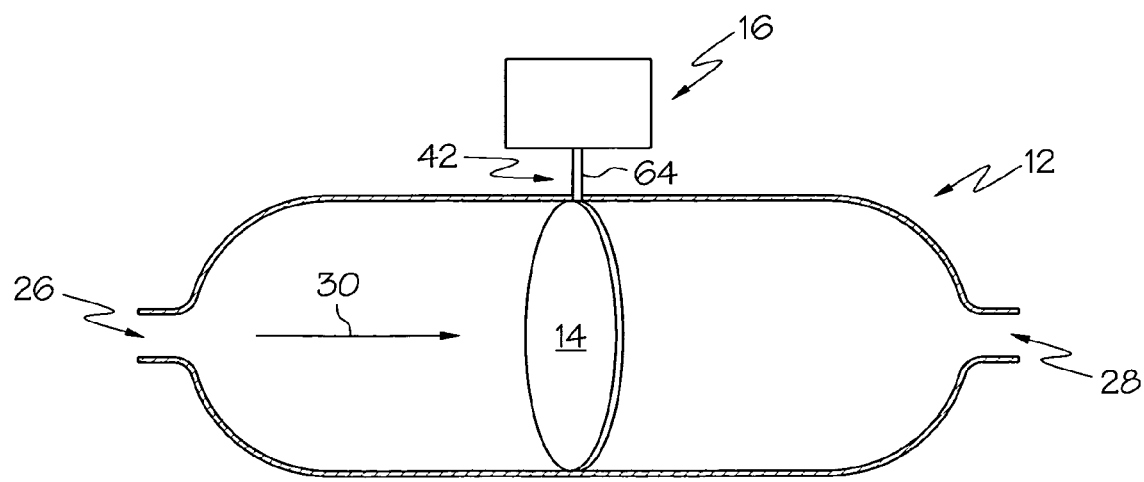
FIG. 3 depicts a schematic view of the valve element of FIG. 2, shown in the closed position.

As shown in FIGS. 1-3, the valve body 12 includes an inlet port 26, an outlet port 28, and a flow passage 30 therebetween. The valve element 14 is disposed within the valve body flow passage 30, and is movable between a full-open position (depicted in FIG. 2), in which fluid is allowed to flow through the valve body flow passage 30, and a closed position (depicted in FIG. 3), in which fluid is restricted from flowing through the valve body flow passage 30. It will be appreciated by one of skill in the art that in certain embodiments the valve element 14 may also be movable into intermediate positions between the full-open and closed positions, throttling fluid flow through the valve body flow passage 30. Generally, the closer the valve element 14 is to the full-open position, the more freely fluid is allowed to flow through the valve body flow passage 30, thereby increasing fluid pressure in the valve body flow passage 30 downstream of the valve element 14. Conversely, the closer the valve element 14 is to the closed position, the less freely fluid is allowed to flow through the valve body flow passage 30, thereby decreasing fluid pressure in the valve body flow passage 30 downstream of the valve element 14. In the depicted embodiment, the valve element 14 is a butterfly valve element. However, it will be appreciated that the valve element 14 can take any one of a number of different shapes, sizes and configurations.

Figure 4:
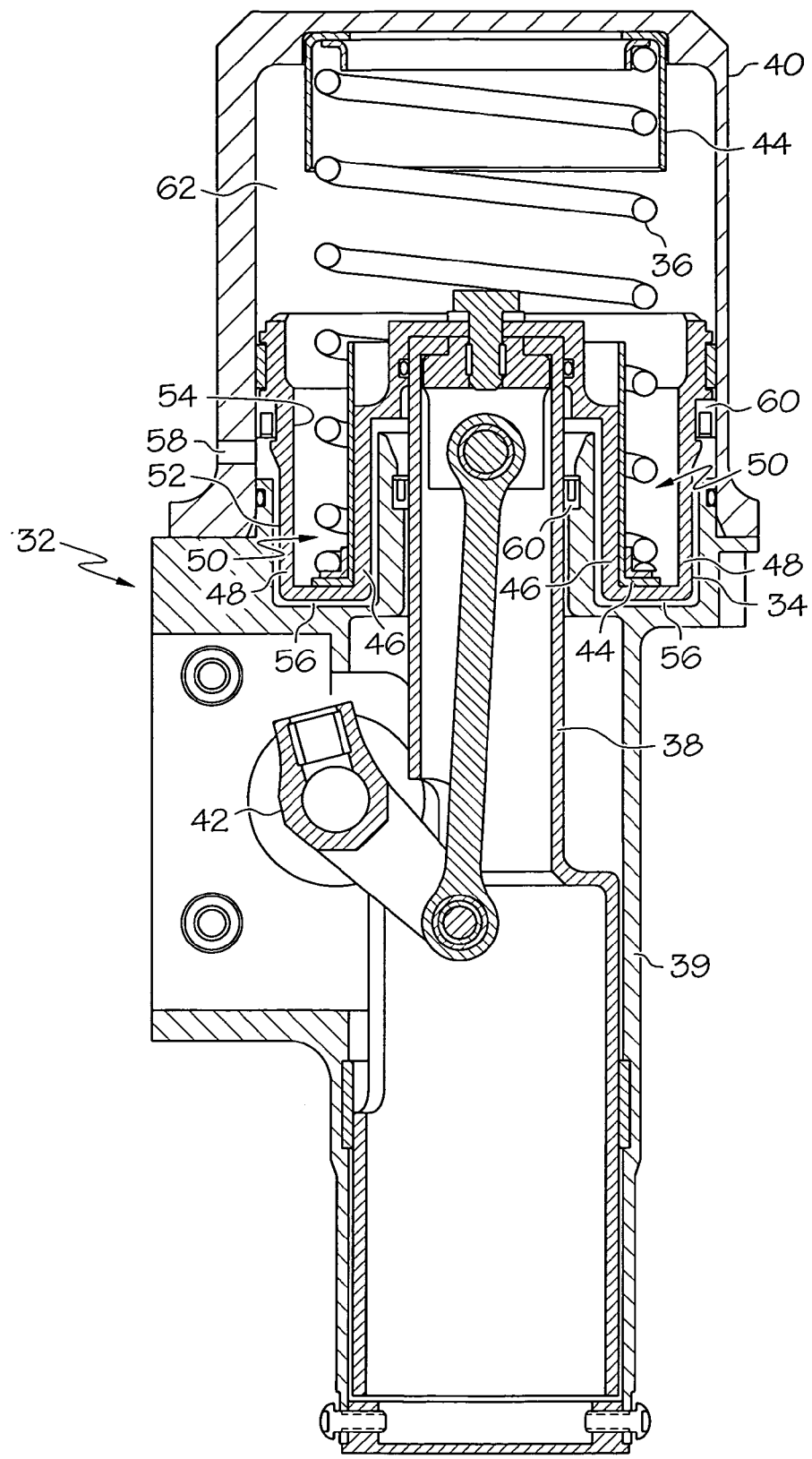
FIG. 4. depicts a cross sectional view of one embodiment of an actuator housing used in the valve assembly of FIG. 1.

The actuator assembly 16 is configured to move the valve element 14, and, as shown in FIGS. 1 and 4, comprises an actuator housing 32, a piston 34, and a spring 36. In some embodiments, the actuator assembly 16 may also include a piston guide 38, an actuator housing cover 40, a linkage assembly 42, and/or a spring guide 44, as depicted in FIG. 4. In the depicted embodiment, the actuator housing 32 includes a lower section 39 and a cover 40.

The piston 34 is disposed within the actuator housing 32, and is coupled to the valve element 14. The piston 34 is configured to move within the actuator housing 32 in a first direction 41 and a second direction 43, to thereby move the valve element 14 toward a first position and a second position, respectively. In a preferred embodiment, when the piston 34 moves in the first direction 41, the valve element 14 is moved toward the full-open position. Conversely, when the piston 34 moves in the second direction 43, the valve element 14 is moved toward the closed position. However, it will be appreciated that the first and second directions 41, 43 can differ from the directions in the preferred embodiment described above, and/or that movement of the piston 34 in particular directions can move the valve element 14 in directions that differ from those described in this preferred embodiment.

As shown more clearly in FIG. 4, the piston 34 includes an inner cylindrical section 46 and an outer cylindrical section 48. The outer cylindrical section 48 of the piston 34 is coupled to, and spaced apart from, the inner cylindrical section 46 to define a recess 50. The recess 50 is configured to at least partially house the spring 36. For example, in the preferred embodiment discussed above, the recess 50 can at least partially house, and will most preferably fully house, the spring 36, after the piston 34 has moved in the second direction 43 within the actuator housing 32. The recess 50 thus allows for storage of the spring 36 without the need for added space and weight in the actuator assembly 16. The recess 50 thereby also improves the center of gravity for the actuator assembly 16, thereby reducing the potential for detrimental effects from vibration.

As depicted in FIGS. 1 and 4, the piston 34 preferably includes at least a first side 52 and a second side 54. In this preferred embodiment the piston 34 defines a closing chamber 56 between the piston first side 52 and the actuator housing 32. The actuator housing 32 preferably includes an inlet port 58 in fluid communication with the closing chamber 56. The inlet port 58 is configured to receive pressurized fluid, whereby a second force is supplied to the piston 34 that urges the piston 34 to move in the second direction 43, against the force of the spring 36. In this embodiment, the actuator assembly preferably includes one or more seals 60 disposed between the closing chamber 56 and the actuator housing 32. The piston 34 also preferably defines an opening chamber 62 between the piston second side 54 and the actuator housing 32. The opening chamber 62 at least partially surrounds the spring 36 which, as mentioned above, supplies a bias force that urges the piston 34 to move in the first direction 41.

The spring 36 is disposed within the actuator housing 32, and is configured to supply a bias force that urges the piston 34 to move in the first direction 41. The spring 36 is at least partially disposed within the recess 50, as mentioned above, and at least partially surrounds the inner cylindrical section 46 of the piston 34. As was also mentioned above, the actuator assembly 16 may also include a piston guide 38, a linkage assembly 42, and/or a spring guide 44. For completeness, each of these components will now be described.

The linkage assembly 42 is coupled to the piston 34 and the valve element 14. In the embodiment of FIG. 1, the linkage assembly is disposed within a chamber 13 having a vent 15. The linkage assembly 42 is configured to at least facilitate movement of the valve element 14 toward the first and second positions when the piston 34 moves within the actuator housing in the first and second directions 41 and 43, respectively. In one preferred embodiment, the linkage assembly 42 includes a shaft 64 coupled to the valve element 14, as depicted in FIGS. 2-3. The spring guide 44 is preferably at least partially disposed between the actuator housing cover 40 and the spring 36, and is movable within the actuator housing 32 in the first and second directions 41, 43.

As mentioned above, the valve assembly 10 may also include a regulator 18, a manual lock 20, a low pressure switch 22, and/or a high pressure switch 24. The regulator 18, which is preferably coupled to both the closing chamber 56 and the opening chamber 62, can help to bleed off air in order to maintain a desired fluid pressure, thereby at least partially compensating for any potential leakage. The manual lock 20 is configured to lock the valve element 14 in either the full-open or closed position, for example when an operator may determine that a manual override is necessary. The low pressure switch 22 is disposed downstream of the valve body flow passage 30, and is configured to indicate that the valve is in an open position. The high pressure switch 24 is also disposed downstream of the valve body flow passage 30, and is configured to indicate that the valve has failed in the full-open position.

The operation of the valve assembly 10 and the actuator assembly 16 is as follows, assuming that the piston 34 is initially disposed in the first position and further assuming, as in the case of a preferred embodiment discussed above, that correspondingly the valve element 14 is in the full-open position. As fluid entering the closing chamber 56 through the inlet port 58 of the actuator housing increases, pressure is exerted against the piston 34 in the second direction 43. Once this pressure exerted against the piston 34 in the second direction 43 overcomes the bias force provided by the spring 36 against the piston 34 in the first direction 41, the piston 34 moves in the second direction 43, toward the second position. Accordingly, in the above-referenced preferred embodiment, the piston 34 moves the valve element 14 toward the closed position, preferably via the linkage assembly 42 and/or the shaft 64, and thereby reducing fluid flow through the valve body flow passage 30.

Conversely, as fluid entering the closing chamber 56 through the inlet port 58 of the actuator housing decreases, less pressure is exerted against the piston 34 in the second direction 43. Once this reduced pressure exerted against the piston 34 in the second direction 43 is overcome by the bias force exerted by the spring 36 against the piston 34 in the first direction 41, the piston 34 moves in the first direction 41, toward the first position. Accordingly, in the above-referenced preferred embodiment, the piston 34 moves the valve element 14 toward the full-open position, preferably via the linkage assembly 42 and/or the shaft 64, and thereby increasing fluid flow through the valve body flow passage 30. In the event of any leakage, the regulator 18 can help to compensate for such leakage by bleeding off air.

The valve assembly 10 and the actuator assembly 16 may be used in various types of systems, including, by way of example only, regulator valve assemblies used in anti-icing systems for aircraft. However, it will be appreciated that the valve assembly 10 and the actuator assembly 16 can also be used in connection with any one of a number of other different types of systems. It will also be appreciated that the movement, operation and configuration of the valve assembly 10, the actuator assembly 16, and/or various components thereof, can take any one of a number of different configurations.

Regardless of the particular configurations, and how and where they are used, the valve assembly 10 and the actuator assembly 16 provide multiple potential benefits. For example, the valve assembly 10 and the actuator assembly 16 reduce the number of potential leak areas, for example because the area surrounding the linkage assembly 42 (see, for example, chamber 13 of FIG. 1) does not need to be pressurized. In addition, the above-described configuration of the regulator 18 helps to compensate for any leakage that may result from the seals 60 in the actuator assembly 16.

Moreover, because of the ability of the recess 50 to at least partially, and preferably completely, house the spring 36 under certain conditions, the size and weight of the actuator assembly 16 can be minimized, for example because a smaller actuator housing cover 40 can be used for the actuator assembly 16. This also improves the center of gravity for the actuator assembly 16, thereby reducing the potential for detrimental effects from vibration.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes can be made in the function and arrangement of elements described in an exemplary embodiment without departing from the scope of the invention as set forth in the appended claims and their legal equivalents.

What is claimed is:

1. A valve actuator assembly, comprising:
    an actuator housing;
    a piston disposed within the actuator housing, the piston configured to couple to a valve element and including an inner cylindrical section and an outer cylindrical section, the outer cylindrical section spaced apart from the inner cylindrical section to define a recess, the piston further configured to move within the actuator housing in a first direction and a second direction, to thereby move the valve element toward an open position and a closed position, respectively, the piston including a first side at least partially defining a pressurized closing chamber and a second side at least partially defining a pressurized opening chamber;
    a regulator coupled between the pressurized closing chamber and the pressurized opening chamber and configured to regulate pressure in the pressurized opening chamber by bleeding off air;
    a dynamic seal in series with the regulator and disposed between the pressurized closing chamber and the actuator housing; and
    a spring disposed within the actuator housing and configured to supply a bias force that urges the piston to move in the first direction, the spring at least partially disposed within the recess and at least partially surrounding the inner cylindrical section.

2. The valve actuator assembly of claim 1, further comprising:
    a piston guide disposed within the actuator housing and coupled to the piston, the piston guide movable within the actuator housing in the first and second directions; and
    a spring guide at least partially disposed between the actuator housing cover and the spring.

3. The valve actuator assembly of claim 1, wherein:
    the pressurized closing chamber is defined by and disposed between the piston first side and the actuator housing.

4. The valve actuator assembly of claim 3, wherein the actuator housing includes an inlet port in fluid communication with the pressurized closing chamber, the inlet port configured to receive pressurized fluid, whereby a second force is supplied to the piston that urges the piston to move in the second direction.

5. The valve actuator assembly of claim 3, further comprising:
    an actuator housing cover at least partially surrounding the actuator housing;
    wherein the pressurized opening chamber is defined by and disposed between the actuator housing cover and the piston second side.

6. The valve actuator assembly of claim 1, further comprising:
    a linkage assembly coupled to the piston and the valve element, the linkage assembly configured to at least facilitate movement of the valve element toward the open and closed positions when the piston moves within the actuator housing in the first and second directions, respectively, wherein the linkage assembly includes a shaft coupled to the valve element.

7. The valve actuator assembly of claim 6, wherein the pressurized closing chamber is pressurized at a first pressure level that is greater than a second pressure level surrounding the pressurized closing chamber.

8. The valve actuator assembly of claim 6, wherein the linkage assembly is disposed in a vented region at least partially surrounding the pressurized closing chamber.

9. The valve actuator assembly of claim 1, wherein the pressurized closing chamber is pressurized at a pressure that is greater than ambient.

10. The valve actuator assembly of claim 1, wherein the seal is disposed adjacent to the piston.

11. A valve assembly, comprising:
    a valve body having an inlet port, an outlet port, and a flow passage therebetween;
    a valve element movably disposed within the valve body flow passage; and an actuator assembly configured to move the valve element, the actuator assembly comprising:
an actuator housing;
a piston disposed within the actuator housing, the piston configured to couple to the valve element and including an inner cylindrical section and an outer cylindrical section, the outer cylindrical section spaced apart from the inner cylindrical section to define a recess, the piston further configured to move within the actuator housing in a first direction and a second direction, to thereby move the valve element toward an open position and a closed position, respectively, the piston including a first side at least partially defining a pressurized closing chamber and a second side at least partially defining a pressurized opening chamber;
a regulator coupled between the pressurized closing chamber and the pressurized opening chamber and configured to regulate pressure in the pressurized opening chamber by bleeding off air;
a dynamic seal in series with the regulator and disposed between the pressurized closing chamber and the actuator housing; and
a spring disposed within the actuator housing and configured to supply a bias force that urges the piston to move in the first direction, the spring at least partially disposed within the recess and at least partially surrounding the inner cylindrical section.

12. The valve assembly of claim 11, further comprising:
a piston guide disposed within the actuator housing and coupled to the piston, the piston guide movable within the actuator housing in the first and second directions; and
a spring guide at least partially disposed between the actuator housing cover and the spring.

13. The valve assembly of claim 11, wherein:
the pressurized closing chamber is defined by and disposed between the piston first side and the actuator housing and has a pressure that is greater than ambient.

14. The valve assembly of claim 13, wherein the actuator housing includes an inlet port in fluid communication with the pressurized closing chamber, the inlet port configured to receive pressurized fluid, whereby a second force is supplied to the piston that urges the piston to move in the second direction.

15. The valve assembly of claim 13, further comprising:
an actuator housing cover at least partially surrounding the actuator housing;
wherein the pressurized opening chamber is defined by and disposed between the actuator housing cover and the piston second side.

16. The valve assembly of claim 11, further comprising:
a linkage assembly coupled to the piston and the valve element, the linkage assembly comprising a shaft coupled to the valve element, the shaft configured to move the valve element toward the open and closed positions when the piston moves within the actuator housing in the first and second directions, respectively.

17. The valve assembly of claim 16, wherein the linkage assembly is disposed in a vented chamber region at least partially surrounding the pressurized closing chamber.

18. The valve assembly of claim 16, wherein the pressurized closing chamber is pressurized at a first pressure level that is greater than a second pressure level surrounding the linkage assembly.

19. A valve actuator assembly, comprising:
an actuator housing;
an actuator housing cover at least partially surrounding the actuator housing;
a piston, having a first side and a second side, the piston disposed within the actuator housing, the piston configured to couple to a valve element and including an inner cylindrical section and an outer cylindrical section, the outer cylindrical section spaced apart from the inner cylindrical section to define a recess, the piston further configured to move within the actuator housing in a first direction and a second direction, to thereby move the valve element toward an open position and a closed position, respectively, and wherein the piston defines a pressurized closing chamber between the piston first side and the actuator housing and a pressurized opening chamber between the piston side and the actuator cover, the pressurized closing chamber and the pressurized opening chamber having respective pressure levels that are each greater than a pressure level surrounding the actuator housing;
a regulator coupled between the pressurized closing chamber and the pressurized opening chamber and configured to regulate pressure in the pressurized opening chamber by bleeding off air; and
a spring disposed within the actuator housing and configured to supply a bias force that urges the piston to move in the first direction, the spring at least partially disposed within the recess and at least partially surrounding the inner cylindrical section.

20. The valve actuator assembly of claim 19, further comprising:
a dynamic seal in series with the regulator and disposed between the pressurized closing chamber and the actuator housing.

* * * * *